(12) United States Patent
Mitsutani

(10) Patent No.: US 8,648,565 B2
(45) Date of Patent: Feb. 11, 2014

(54) POWER SUPPLY SYSTEM OF VEHICLE

(75) Inventor: Noritake Mitsutani, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 428 days.

(21) Appl. No.: 13/000,772

(22) PCT Filed: Dec. 9, 2008

(86) PCT No.: PCT/JP2008/072313
§ 371 (c)(1),
(2), (4) Date: Dec. 22, 2010

(87) PCT Pub. No.: WO2010/067417
PCT Pub. Date: Jun. 17, 2010

(65) Prior Publication Data
US 2011/0101915 A1 May 5, 2011

(51) Int. Cl.
*H02J 7/00* (2006.01)
(52) U.S. Cl.
USPC ............ 320/109; 320/103; 320/104; 320/115
(58) Field of Classification Search
USPC .................................. 320/103, 104, 109, 115
See application file for complete search history.

(56) References Cited

U.S. PATENT DOCUMENTS

2007/0227792 A1* 10/2007 Yonemori et al. ............ 180/65.3
2009/0107743 A1* 4/2009 Alston et al. ............... 180/65.21

FOREIGN PATENT DOCUMENTS

| JP | A 2-193532 | 7/1990 |
| JP | A 9-308126 | 11/1997 |
| JP | B2 3247230 | 11/2001 |
| JP | A 2007-209168 | 8/2007 |
| JP | A 2008-187884 | 8/2008 |
| JP | A 2008-211955 | 9/2008 |

OTHER PUBLICATIONS

International Search Report issued in corresponding International Application No. PCT/JP2008/072313, mailed Mar. 10, 2009, (with English-language translation).

* cited by examiner

*Primary Examiner* — Samuel Berhanu
(74) *Attorney, Agent, or Firm* — Oliff PLC

(57) ABSTRACT

A charging system of a vehicle for charging a vehicle-mounted power storage device includes a charger configured to receive electric power from a power supply external to the vehicle for charging the power storage device, a charging power sensing portion for sensing charging power supplied to the power storage device, and a charging control device for performing control on the charger by generating a power command value for the charger based on a target value. The charging control device detects a difference between charging power sensed by the charging power sensing portion and the target value and determines presence/absence of abnormality of the charger based on the detected difference.

6 Claims, 10 Drawing Sheets

POWER SUPPLY SYSTEM OF VEHICLE

TECHNICAL FIELD

The present invention relates to a power supply system of a vehicle and more particularly to a charging system of a vehicle provided with a power storage device configured to be chargeable from an external power supply.

BACKGROUND ART

Batteries for electric vehicles and the like, which are charged by chargers, have not only a load aspect of receiving power supply from chargers but also a power-supply aspect of supplying power to a variety of electric loads. Even in an abnormal state in which the temperature of batteries is out of a prescribed range, cooling devices such as fans for cooling batteries and other battery protection circuits operate, and therefore electric power is supplied to these circuits using batteries as power supplies.

However, if a battery is allowed to drive electric loads when abnormality of the battery is detected, charging power of the battery is wasted only for battery protection. As a result, considerable charging power has been consumed when the battery abnormal state is eliminated, and even if charging of the battery is resumed immediately after the abnormal state is eliminated, the charging time is prolonged to compensate for the consumed power.

Furthermore, some of electric loads that are essentially supplied with power of the charged battery are required to operate irrespective of the battery abnormal state. For example, in a case of automobiles, a variety of auxiliary equipment such as a light and an air-conditioner, which are connected as electric loads of batteries, may be required to operate regardless of the battery state. Therefore, when such electric loads start to operate, it becomes necessary to supply them with power from batteries, which is inconvenient in terms of charging.

Patent Publication No. 3247230 (Patent Document 1) discloses a charging control apparatus for an electric vehicle, in which when charging has to be interrupted temporarily depending on a battery state, power is supplied by a charger only by the amount consumed by auxiliary equipment such as a cooling fan, an air conditioner, and a light, based on a driving state of the auxiliary equipment, thereby suppressing battery power consumption.

Patent Document 1: Japanese Patent Publication No. 3247230

DISCLOSURE OF THE INVENTION

Problems to be Solved by the Invention

However, in the charging control apparatus for an electric vehicle as disclosed in the above-noted Patent Publication No. 3247230, when charging power cannot be set to zero correctly due to an error of a battery current sensor or the like, long-time charging may sometimes continue, and in such a case, overcharge of the battery may occur, which shortens the battery life. Furthermore, the charger may be failed in some cases, and the need for stopping charging and protecting the battery may arise depending on the state of failure of the charger.

An object of the present invention is to provide a charging system of a vehicle, which allows charging of a vehicle-mounted power storage device from an external power supply with a reduced possibility of battery overcharge.

Means for Solving the Problems

In summary, the present invention provides a charging system of a vehicle for charging a vehicle-mounted power storage device. The charging system includes: a charger configured to receive electric power from a power supply external to the vehicle for charging the power storage device; a charging power sensing portion for sensing charging power supplied to the power storage device; and a charging control device for performing control on the charger by generating a power command value for the charger based on a target value. The charging control device detects a difference between charging power sensed by the charging power sensing portion and the target value and determines presence/absence of abnormality of the charger based on the detected difference.

Preferably, the vehicle includes auxiliary equipment that can be driven by part of electric power output from the charger. The charging system of the vehicle further includes a charger output power sensing portion for sensing electric power output from the charger. The charging control device determines whether or not auxiliary equipment power consumption in the auxiliary equipment is excessive to secure appropriate charging power, based on the electric power output from the charger and the charging power, and if it is determined that the auxiliary equipment power consumption is excessive, executes vehicular system forced termination including stopping operation of the auxiliary equipment when a state of charge of the power storage device becomes smaller than a threshold value or when a time period during which the auxiliary equipment power consumption is excessive exceeds a prescribed time.

More preferably, if it is determined that the auxiliary equipment power consumption is excessive, the charging control device interrupts external charging to the power storage device by the charger and resumes charging to the power storage device when the auxiliary equipment power consumption decreases after interruption to bring about a state in which appropriate charging power can be secured.

More preferably, the appropriate charging power is power greater than a lower limit value at which a state of charge of the power storage device can be estimated appropriately based on output of the charging power sensing portion.

More preferably, the power storage device includes a first power storage device connected to a power supply path to the auxiliary equipment and a second power storage device to which output of the charger is connected. The charging system of the vehicle further includes: a first voltage converter for performing voltage conversion between voltage of the first power storage device and supply voltage to an electric load; and a second voltage converter for performing voltage conversion between voltage of the second power storage device and the supply voltage. The charging control device selects a charging target receiving the charging power from the charger from the first and second power storage devices by controlling the first and second voltage converters. In a case where the first power storage device is a charging target, if it is determined that the auxiliary equipment power consumption is excessive, the charging control device interrupts external charging to the charging target by the charger and resumes charging to the charging target when the auxiliary equipment power consumption decreases after interruption to bring about a state in which appropriate charging power can be secured. In a case where the second power storage device is a charging target, if it is determined that the auxiliary equipment power consumption is excessive, the charging control device executes vehicular system forced termination including stopping operation of the auxiliary equipment when a state of charge of the charging target becomes smaller than a threshold value or when a time period during which the auxiliary equipment power consumption is excessive exceeds a prescribed time.

Preferably, the vehicle includes a motor for driving the vehicle that receives electric power from the power storage device to operate and an internal combustion engine for driving the vehicle together with the motor.

Effects of the Invention

In accordance with the present invention, the possibility of overcharge of a power storage device is reduced when charging from an external power supply is executed, so that the possibility of having an adverse effect on life of the power storage device is reduced.

DESCRIPTION OF THE REFERENCE SIGNS 10-1 to 10-3 power storage device, 11-1 to 11-3 system main relay, 12-1 to 12-2 voltage converter, 13-1 chopper circuit, 14-1 to 14-3, 18-1 to 18-2, 20, 91, 93, 94 voltage sensor, 16-1 to 16-3, 19, 92, 95 current sensor, 22 auxiliary equipment, 23 DC/DC converter, 24 auxiliary battery, 30-1 to 30-2 inverter, 32-1 to 32-2 motor generator, 34 power split device, 36 engine, 38 driving wheel, 42 charger, 43 pilot lamp, 44 vehicle inlet, 45 navigation ECU, 46 charging ECU, 48 external power supply, 52 power calculation portion, 53 subtraction portion, 54 feedback control portion, 62 addition portion, 65 output restriction portion, 80 power restriction portion, 81 filter, 82 AC/DC conversion portion, 83, C, C1 smoothing capacitor, 84 DC/AC conversion portion, 85 isolation transformer, 86 rectification portion, 87 temperature sensor, 88 microcomputer, 100 hybrid vehicle, D1A, D1B diode, L1 inductor, LN1A positive bus, LN1B line, LN1C negative bus, MNL main negative bus, MPL main positive bus, NL1, NL2, NLC negative line, PL1, PL2, PLC positive line, Q1A, Q1B switching element.

BEST MODES FOR CARRYING OUT THE INVENTION

In the following, an embodiment of the present invention will be described in detail with reference to the figures. It is noted in the figures the same or corresponding parts are denoted with the same reference signs and a description thereof will not be repeated.

[Overall Structure of Vehicle]

Figure 1:
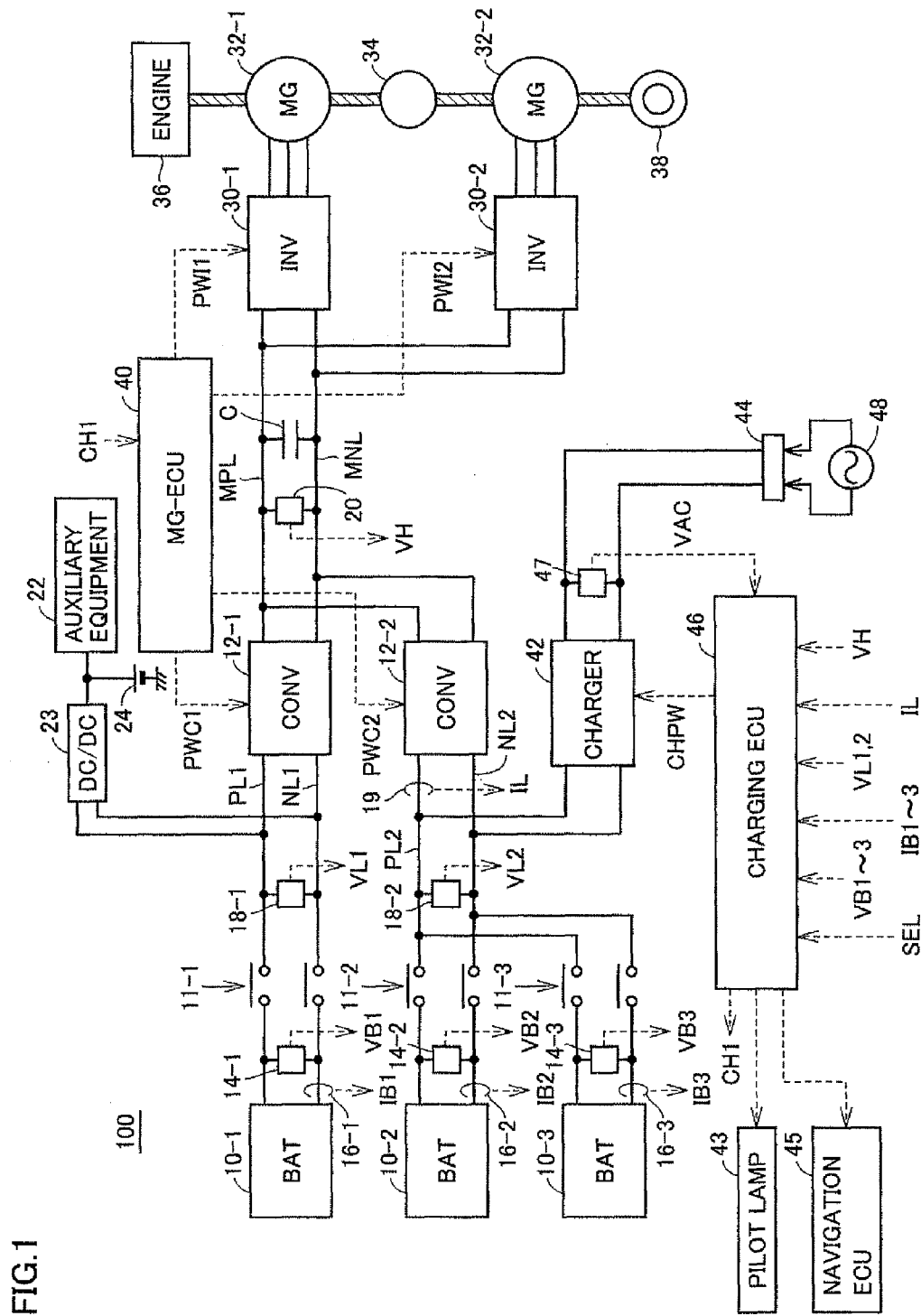
FIG. 1 is an overall block diagram of a hybrid vehicle shown as an example of an electrically-powered vehicle in accordance with the present invention.

FIG. 1 is an overall block diagram of a hybrid vehicle shown as an example of an electrically-powered vehicle in accordance with the present invention.

Referring to FIG. 1, a hybrid vehicle 100 includes power storage devices 10-1 to 10-3, system main relays 11-1 to 11-3, converters 12-1, 12-2, a main positive bus MPL, a main negative bus MNL, a smoothing capacitor C, and auxiliary equipment 22. In addition, hybrid vehicle 100 further includes inverters 30-1, 30-2, motor generators 32-1, 32-2, a power split device 34, an engine 36, and a driving wheel 38. Furthermore, hybrid vehicle 100 includes voltage sensors 14-1 to 14-3, 18-1, 18-2, 20, current sensors 16-1 to 16-3, 19, and MG-ECU (Electronic Control Unit) 40. Hybrid vehicle 100 further includes a charger 42, a vehicle inlet 44, and a charging ECU 46.

Each of power storage devices 10-1 to 10-3 is a rechargeable DC (direct current) power supply and includes, for example, a nickel metal hydride or lithium ion secondary battery, a large-capacitance capacitor, and the like. Power storage device 10-1 is connected to converter 12-1 through system main relay 11-1, and power storage devices 10-2, 10-3 are connected to converter 12-2 through system main relays 11-2, 11-3, respectively. It is noted that in the following power storage device 10-1 is sometimes called "master battery" and power storage devices 10-2, 10-3 are sometimes called "slave batteries."

System main relay 11-1 is provided between power storage device 10-1 and converter 12-1. System main relay 11-2 is provided between power storage device 10-2 and converter 12-2, and system main relay 11-3 is provided between power storage device 10-3 and converter 12-2. In order to avoid a short-circuit between power storage device 10-2 and power storage device 10-3, system main relays 11-2, 11-3 are selectively turned on and are not turned on at the same time.

Converters 12-1, 12-2 are connected to main positive bus MPL and main negative bus MNL in parallel with each other. Converter 12-1 performs voltage conversion between power storage device 10-1 and main positive bus MPL and main negative bus MNL based on a signal PWC1 from MG-ECU 40. Converter 12-2 performs voltage conversion between main positive bus MPL and main negative bus MNL and one of power storage device 10-2 and power storage device 10-3 electrically connected to converter 12-2, based on a signal PWC2 from MG-ECU 40.

Auxiliary equipment 22 is connected to a positive line PL1 and a negative line NL1 disposed between system main relay 11-1 and converter 12-1. Smoothing capacitor C is connected between main positive bus MPL and main negative bus MNL to reduce power variation components included in main positive bus MPL and main negative bus MNL.

Inverters 30-1, 30-2 are connected to main positive bus MPL and main negative bus MNL in parallel with each other. Inverter 30-1 drives motor generator 32-1 based on a signal PWI1 from MG-ECU 40, Inverter 30-2 drives motor generator 32-2 based on a signal PWI2 from MG-ECU 40.

Motor generators 32-1, 32-2 are AC rotating electric machines, for example, permanent magnet-type synchronous motors including rotors having permanent magnets embedded therein. Motor generators 32-1, 32-2 are coupled to power split device 34. Power split device 34 includes a planetary gear including a sun gear, a pinion gear, a carrier, and a ring gear. The pinion gear is engaged with the sun gear and the ring gear. The carrier supports the pinion gear such that the pinion gear can rotate on its own axis, and is coupled to a crankshaft of engine 36. The sun gear is coupled to a rotation shaft of motor generator 32-1. The ring gear is coupled to a rotation shaft of motor generator 32-2 and driving wheel 38. This power split device 34 divides motive power generated by engine 36 into a path for transmission to driving wheel 38 and a path for transmission to motor generator 32-1.

Then, motor generator 32-1 generates electric power using motive power of engine 36 that is divided by power split device 34. For example, when SOC of power storage devices 10-1 to 10-3 decreases, engine 36 is started and motor generator 32-1 generates electric power, which is then supplied to the power storage devices.

On the other hand, motor generator 32-2 generates driving force using at least one of electric power supplied from at least one of power storage devices 10-1 to 10-3 and electric power generated by motor generator 32-1. The driving force of motor generator 32-2 is transmitted to driving wheel 38. It is noted that at a time of braking of the vehicle, kinetic energy of the vehicle is transmitted from driving wheel 38 to motor generator 32-2 to drive motor generator 32-2, so that motor generator 32-2 operates as a generator. Accordingly, motor generator 32-2 operates as a regenerative brake that converts kinetic energy of the vehicle into electric power for recovery.

MG-ECU 40 generates signals PWC1, PWC2 for driving converters 12-1, 12-2, respectively, and outputs the generated signals PWC1, PWC2 to converters 12-1, 12-2, respectively. Furthermore, MG-ECU 40 generates signals PWI1, PWI2 for driving motor generators 32-1, 32-2, respectively, and outputs the generated signals PWI1, PWI2 to inverters 30-1, 30-2, respectively.

In addition, when power storage device 10-1 is charged by charger 42, a signal CH1 received from charging ECU 46 is activated, and then MG-ECU 40 generates signals PWC1, PWC2 for output to converters 12-1, 12-2, respectively, so that charging power is supplied successively from charger 42 to power storage device 10-1 through converter 12-2, main positive bus MPL and main negative bus MNL as well as converter 12-1.

Charger 42 has its input end connected to vehicle inlet 44 and its output end connected to positive line PL2 and negative line NL2 disposed between system main relays 11-2, 11-3 and converter 12-2. Charger 42 receives from vehicle inlet 44 electric power supplied from a power supply external to the vehicle (hereinafter also referred to as "external power supply") 48. Then, charger 42 receives a power command value CHPW from charging ECU 46 and controls output power such that output power of charger 42 agrees with power command value CHPW, while controlling output voltage of charger 42 at a prescribed DC voltage. Vehicle inlet 44 is a power interface for receiving electric power from external power supply 48.

Hybrid vehicle 100 further includes a voltage sensor 47. Voltage sensor 47 detects voltage VAC provided to vehicle inlet 44 from the outside and outputs the detected value to charging ECU 46.

Voltage sensors 14-1 to 14-3 detect voltage VB1 of power storage device 10-1, voltage VB2 of power storage device 10-2 and voltage VB3 of power storage device 10-3, respectively, and output the detected values to charging ECU 46. Current sensors 16-1 to 16-3 detect current IB1 input/output from/to power storage device 10-1, current IB2 input/output from/to power storage device 10-2 and current IB3 input/output from/to power storage device 10-3, respectively, and output the detected values to charging ECU 46.

Voltage sensors 18-1, 18-2 detect voltage VL1 between positive line PL1 and negative line NL1 and voltage VL2 between positive line PL2 and negative line NL2, respectively, and output the detected values to charging ECU 46. Current sensor 19 detects current IL of positive line PL2 input/output from/to converter 12-2 and outputs the detected value to charging ECU 46, It is noted that when charging of power storage device 10-1 is performed by charger 42, current sensor 19 can detect current flowing from charger 42 to converter 12-2. Voltage sensor 20 detects voltage VH between main positive bus MPL and main negative bus MNL and outputs the detected value to charging ECU 46.

Charging ECU 46 calculates a target value PR of charging power (kW/h) of power storage devices 10-1 to 10-3 at the time of charging of power storage devices 10-1 to 10-3 by external power supply 48 connected to vehicle inlet 44.

For example, in a case where constant power charging (CP charging) is executed, first, rapid charging is executed when the state of charge (SOC) of the power storage device is at a prescribed value or less. At this point, target value PR is set based on voltage VAC detected by voltage sensor 47. For example, if voltage VAC is AC (alternating current) 200V, it is set at 2.0 kW/h, and if voltage VAC is AC 100V, it is set at 1.2 kW/h. Thereafter, when the state of charge of the power storage device is between a prescribed value and a full charging threshold value, additional charging is performed. Here, target value PR is set at a fixed value, for example, 0.5 kW/h.

Furthermore, in a case where constant power charging (CP charging) is performed at a time of rapid charging and constant voltage charging (CV charging) is thereafter performed at a time of additional charging, target value PR is set similarly as above at the time of rapid charging and target value PR is adjusted at the time of additional charging such that voltage VB of the power storage device is maintained at the final target voltage of full charging (charging is terminated when target value PR becomes in the vicinity of 0 kW/h).

Charging ECU 46 receives from a not-shown vehicle ECU a signal SEL indicating which power storage devices 10-1 to 10-3 is charged by charger 42. In other words, in the present embodiment, power storage devices 10-1 to 10-3 are successively charged in a predetermined order.

It is noted that when charging of power storage device 10-1 is performed, a signal CH1 is output from charging ECU 46 to MG-ECU 40, and converters 12-1, 12-2 operate such that electric power flows from charger 42 to power storage device 10-1 through converter 12-2 and converter 12-1. Here, auxiliary equipment 22 connected between power storage device 10-1 and converter 12-1 is operated by power supplied from charger 42 when charging of power storage device 10-1 is performed. On the other hand, when charging of power storage device 10-2 or 10-3 is performed, auxiliary equipment 22 receives power supply from power storage device 10-1.

Then, at a time of charging of power storage devices 10-1 to 10-3 by external power supply 48, charging ECU 46 generates a power command value CHPW indicating a target value of output power of charger 42 and outputs the generated power command value CHPW to charger 42.

Here, charging ECU 46 receives each detected value of voltage VB1 to VB3, VL1, VL2, VH and current IB1 to IB3, IL and performs feedback correction of power command value CHPW of charger 42 based on above-noted each detected value such that charging power actually supplied to power storage devices 10-1 to 10-3 agrees with target value PR. In other words, in this embodiment, charger 42 is controlled such that output power of charger 42 agrees with the target value, and in addition, power command value CHPW is feedback-corrected based on the state of the power storage device such that the actual charging power of the power storage device agrees with the target value. This ensures that charging power of power storage devices 10-1 to 10-3 agrees with target value PR.

Vehicle 100 further includes a DC/DC converter 23 connected to positive line PL1 and negative line NL1 for performing voltage conversion, auxiliary equipment 22 receiving power supply current from DC/DC converter 23, and an auxiliary battery 24 connected to auxiliary equipment 22 as well as DC/DC converter 23. When DC/DC converter 23 stops a voltage conversion operation, power is supplied to auxiliary equipment 22 from auxiliary battery 24. Furthermore, DC/DC converter 23 not only supplies power supply current to auxiliary equipment 22 but also supplies charging current to auxiliary battery 24.

Charging ECU 46 performs control such that DC/DC converter 23 is operated or stopped when charging is performed from the outside by charger 42. In addition, when external charging is executed by charging ECU 46, a pilot lamp 43 is turned on indicating to the driver present outside the vehicle that charging is underway. Therefore, pilot lamp 43 is preferably provided outside the vehicle (for example, at the bottom of the side mirror). When the key of the vehicle is inserted and the vehicle is in the activated state (IG-ON or Ready ON state), charging ECU 46 allows navigation ECU 45 to display that the vehicle is being charged in order to notify the driver that charging is underway.

Then, when an abnormality occurs in charger 42 or charging proceeds quite slowly due to large power consumption by auxiliary equipment 22 during charging, pilot lamp 43 is caused to flash or a command is sent to navigation ECU 45 to display that auxiliary equipment 22 is during operation, so that the driver is prompted to stop the operation of auxiliary equipment 22 that is unnecessary.

The present embodiment is premised on a charging system having the following characteristics A-F: A) a plug-in charging system capable of receiving power supply based on a command value from another ECU mounted on the vehicle; B) a system capable of monitoring charging power or auxiliary equipment power consumption by a voltage sensor or a current sensor provided for the power storage device and capable of monitoring power supplied by charger 42 using voltage sensor 18-2, current sensor 19 provided immediately below charger 42 for driving control; C) a system having a plurality of power storage devices and having mixed charging patterns for each of a case where power storage device 10-1 for driving the auxiliary equipment and the power storage device to be charged are the same and a case where they are different; D) a system having charger 42 capable of saving operation by a thermistor or the like provided inside, at a time of overheating; E) a system capable of displaying arbitrary information on a navigation screen when the user turns on the ignition key switch (IG-ON); F) a system that notifies the user of the state of charge in a simple manner by causing pilot lamp 43 provided outside the vehicle to turn on and flash.

Figure 2:
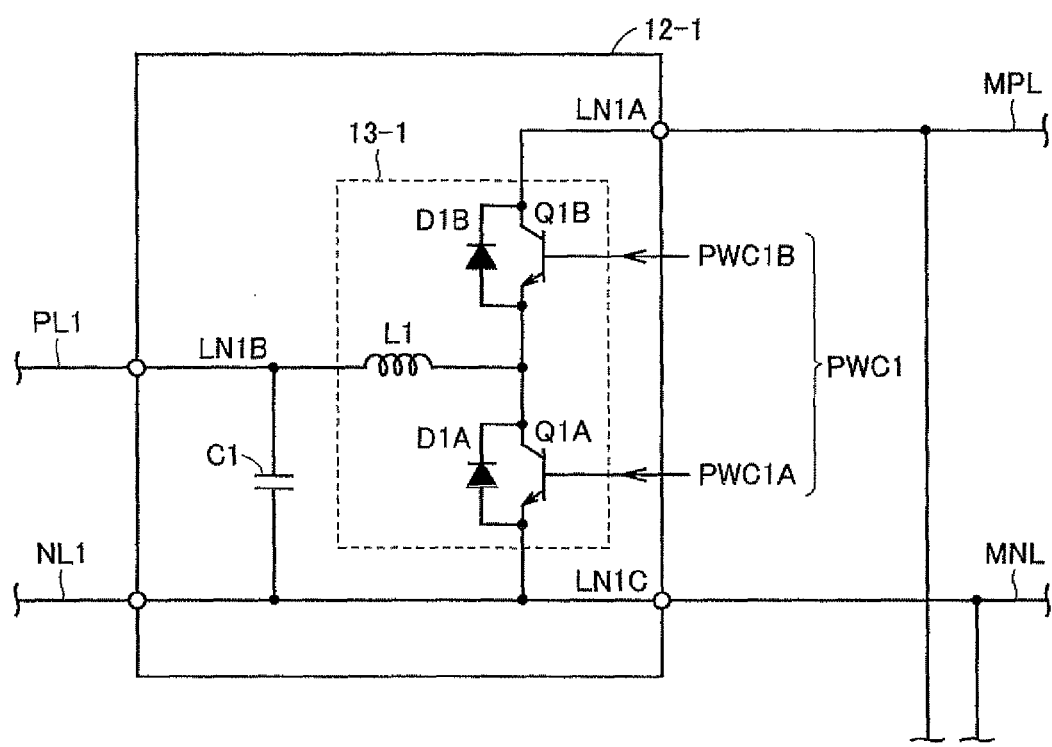
FIG. 2 is a schematic structural diagram of converters 12-1, 12-2 shown in FIG. 1.

FIG. 2 is a schematic structural diagram of converters 12-1, 12-2 shown in FIG. 1. It is noted that each converter has a similar structure and operation, and therefore the structure and operation of converter 12-1 will representatively be described below.

Referring to FIG. 2, converter 12-1 includes a chopper circuit 13-1, a positive bus LN1A, a negative bus LN1C, a line LN1B, and a smoothing capacitor C1. Chopper circuit 13-1 includes switching elements Q1A, Q1B, diodes D1A, D1B, and an inductor L1.

Positive bus LN1A has one end connected to the collector of switching element Q1B and the other end connected to main positive bus MPL. Negative bus LN1C has one end connected to negative line NL1 and has the other end connected to main negative bus MNL.

Switching elements Q1A, Q1B are connected in series between negative bus LN1C and positive bus LN1A. Specifically, the emitter of switching element Q1A is connected to negative bus LN1C and the collector of switching element Q1B is connected to positive bus LN1A. Diodes D1A, D1B are connected in anti-parallel with switching elements Q1A, Q1B, respectively. Inductor L1 is connected between the connection node of switching elements Q1A, Q1B and line LN1B.

Line LN1B has one end connected to positive line PL1 and the other end connected to inductor L1. Smoothing capacitor C1 is connected between line LN1B and negative bus LN1C to reduce AC component included in DC voltage between line LN1B and negative bus LN1C.

Chopper circuit 13-1 performs bidirectional DC voltage conversion between power storage device 10-1 (FIG. 1) and main positive bus MPL and main negative bus MNL, in response to signal PWC1 from MG-ECU 40 (FIG. 1). Signal PWC1 includes a signal PWC1A for controlling on/of switching element Q1A forming the lower arm element and a signal PWC1B for controlling on/off of switching element Q1B forming the upper arm element. Then, the duty ratio (ON/OFF period ratio) of switching elements Q1A, Q1B in a certain duty cycle (the sum of ON period and OFF period) is controlled by MG-ECU 40.

When switching elements Q1A, Q1B are controlled such that the ON duty of switching element Q1A is greater (the ON duty of switching element Q1B is smaller since switching elements Q1A, Q1B are complimentarily on/off-controlled except for the dead time period), the amount of pump current flowing from power storage device 10-1 to inductor L1 increases and electromagnetic energy accumulated in inductor L1 increases. As a result, the amount of current released from inductor L1 to main positive bus MPL through diode D1B increases at a timing of transition from the ON state to the OFF state of switching element Q1A, so that voltage of main positive bus MPL rises.

On the other hand, when switching elements Q1A, Q1B are controlled such that the ON duty of switching element Q1B is greater (the ON duty of switching element Q1A is smaller), the amount of current flowing from main positive bus MPL to power storage device 10-1 through switching element Q1B and inductor L1 increases, so that voltage of main positive bus MPL drops.

In this manner, by controlling the duty ratio of switching elements Q1A, Q1B, voltage of main positive bus MPL can be controlled, and in addition, the direction of current (electric power) and the amount of current (the amount of electric power) fed between power storage device 10-1 and main positive bus MPL can be controlled.

Figure 3:
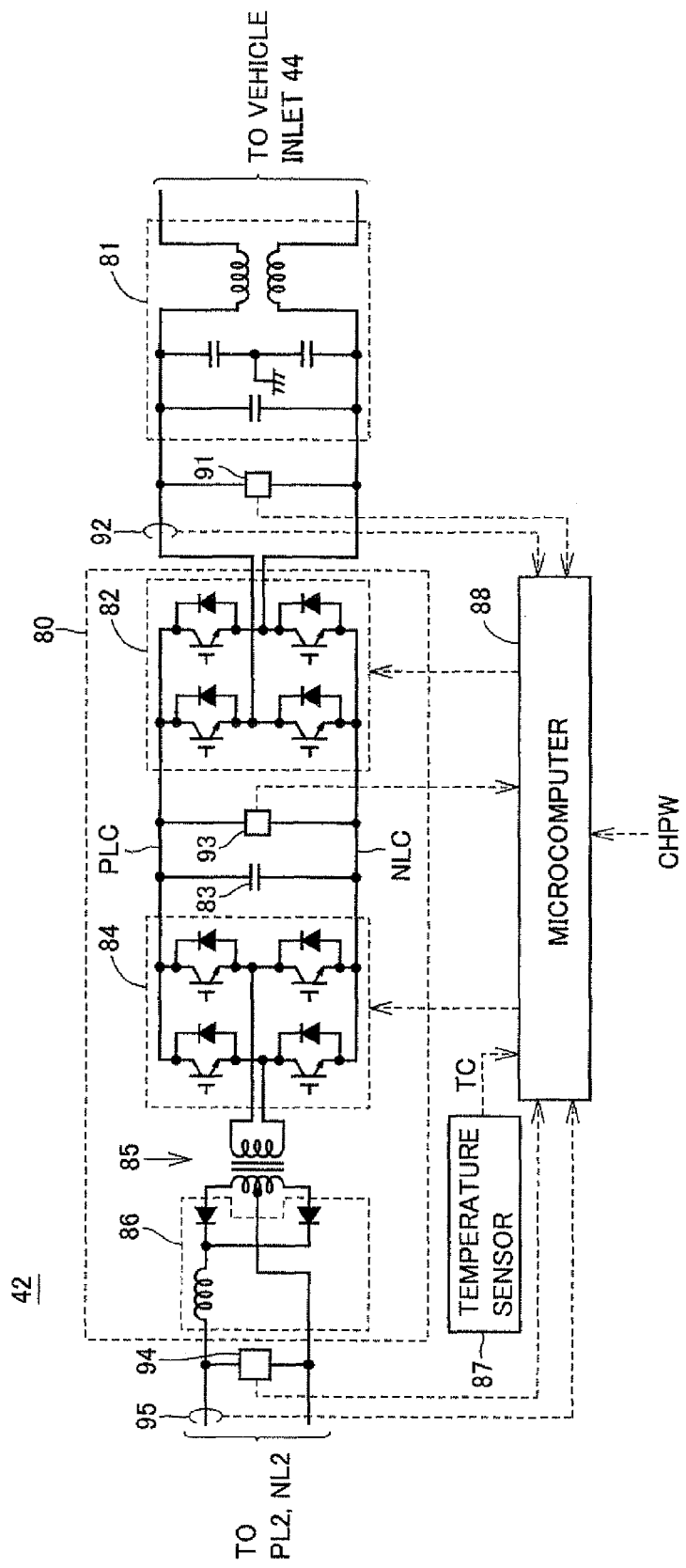
FIG. 3 is a schematic structural diagram of a charger 42 shown in FIG. 1.

FIG. 3 is a schematic structural diagram of charger 42 shown in FIG. 1.

Referring to FIG. 3, charger 42 includes a filter 81, a power restriction portion 80, a temperature sensor 87, voltage sensors 91, 93, 94, current sensors 92, 95, and a microcomputer 88.

Power restriction portion 80 includes an AC/DC conversion portion 82, a smoothing capacitor 83, a DC/AC conversion portion 84, an isolation transformer 85, and a rectification portion 86.

Filter 81 is provided between vehicle inlet 44 (FIG. 1) and AC/DC conversion portion 82 to prevent high-frequency noise from being output from vehicle inlet 44 to external power supply 48 at a time of charging of power storage devices 10-1 to 10-3 by external power supply 48 (FIG. 1). AC/DC conversion portion 82 includes a single-phase bridge circuit. AC/DC conversion portion 82 converts AC power supplied from external power supply 48 into DC power for output to positive line PLC and negative line NLC, based on a driving signal from microcomputer 88. Smoothing capacitor 83 is connected between positive line PLC and negative line NLC to reduce a power variation component included between positive line PLC and negative line NLC.

DC/AC conversion portion 84 includes a single-phase bridge circuit. DC/AC conversion portion 84 converts DC power supplied from positive line PLC and negative line NLC into high-frequency AC power for output to isolation transformer 85, based on a driving signal from microcomputer 88. Isolation transformer 85 includes a core including a magnetic material and a primary coil and a secondary coil wound around the core. The primary coil and the secondary coil are electrically isolated and connected to DC/AC conversion portion 84 and rectification portion 86, respectively. Then, isolation transformer 85 converts high-frequency AC power received from DC/AC conversion portion 84 into a voltage level in accordance with the turns ratio of the primary coil and the secondary coil and outputs the converted AC power to rectification portion 86. Rectification portion 86 rectifies AC power output from isolation transformer 85 into AC power for output to positive line PL2 and negative line NL2.

Voltage sensor 91 detects voltage of external power supply 48 following filter 81 and outputs the detected value to microcomputer 88. Current sensor 92 detects current supplied from external power supply 48 and outputs the detected value to microcomputer 88. Voltage sensor 93 detects voltage between positive line PLC and negative line NLC and outputs the detected value to microcomputer 88. Voltage sensor 94 detects voltage of the output side of rectification portion 86 and outputs the detected value to microcomputer 88. Current sensor 95 detects current output from rectification portion 86 and outputs the detected value to microcomputer 88.

Microcomputer 88 generates a driving signal for driving AC/DC conversion portion 82 and DC/AC conversion portion 84, based on each detected value of voltage sensors 91, 93, 94 and current sensors 92, 95, so that output power of charger 42 that is calculated based on the detected values of voltage sensor 94 and current sensor 95 agrees with power command value CHPW. Then, microcomputer 88 outputs the generated driving signal to AC/DC conversion portion 82 and DC/AC conversion portion 84.

Temperature sensor 87 detects whether or not a saving operation condition that charger 42 is likely to reach an overheating state is met. Specifically, temperature sensor 87 detects temperature TC of charger 42 and transmits the same to microcomputer 88. Microcomputer 88 changes an operation mode of charger 42 between a saving mode and a normal mode, based on temperature TC output by temperature sensor 87. Power restriction portion 80 restricts electric power from the power supply external to the vehicle under control of microcomputer 88 and supplies the electric power as charging power to power storage devices 10-1 to 10-3.

Figure 4:
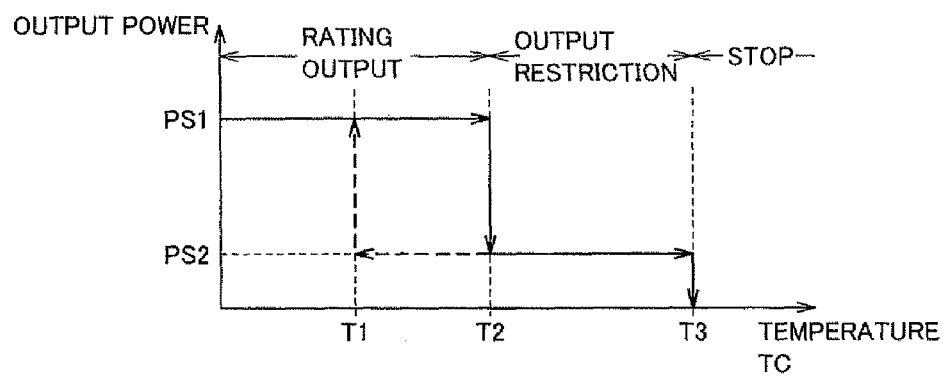
FIG. 4 is a diagram showing a changing limit value of charging power determined by a microcomputer 88 in FIG. 3.

FIG. 4 is a diagram showing a changing limit value of charging power that is determined by microcomputer 88 in FIG. 3.

In FIG. 4, the vertical axis represents output power from charger 42 which serves as charging power. The horizontal axis represents temperature TC detected by temperature sensor 87. Microcomputer 88 sets rating output PS1 as an output limit value of charger 42 until threshold temperature T2 is reached from a low temperature state. The operation mode in this case is a normal mode. Then, when temperature TC exceeds threshold temperature T2, the operation mode shifts to the saving mode to allow power restriction portion 80 to execute an output restriction operation. The output limit value in this case reduces from PS1 to PS2.

Then, charger 42 is operated in the saving mode when temperature TC is between threshold temperature T2 and threshold temperature T3. Furthermore, when temperature TC exceeds threshold temperature T3, microcomputer 88 stops the operation of power restriction portion 80 and stops charging.

On the other hand, when temperature TC drops below threshold temperature T3 because of stopping of charging, the charger is operated again in the saving mode, and the saving mode is maintained until temperature TC drops to threshold temperature T1. Then, when temperature TC further drops below threshold temperature T1, the operation mode of charger 42 is returned to the normal mode.

Figure 5:
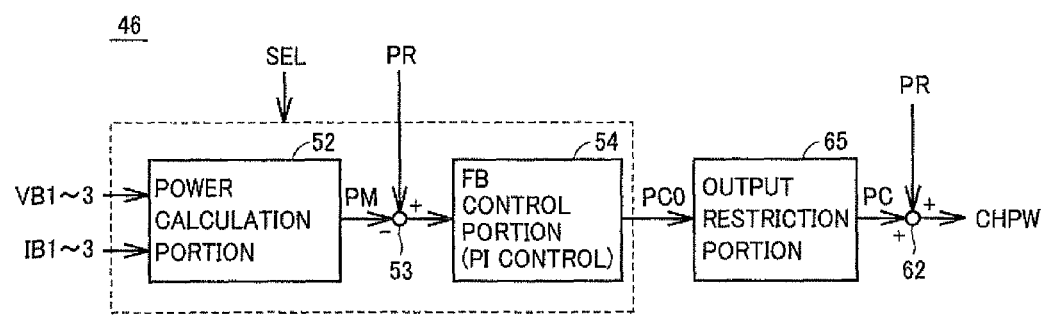
FIG. 5 is a functional block diagram of a charging ECU 46 shown in FIG. 1.

FIG. 5 is a functional block diagram of charging ECU 46 shown in FIG. 1.

Referring to FIG. 5, charging ECU 46 includes a power calculation portion 52, a subtraction portion 53, a feedback (FB) control portion 54, an output restriction portion 65, and an addition portion 62.

When charging of power storage device 10-1 is performed by charger 42, power calculation portion 52 calculates charging power of power storage device 10-1 based on the detected values of voltage VB1 and current IB1 and outputs the operation result as a monitor value PM to subtraction portion 53. Here, it is determined by a signal SEL received from the not-shown vehicle ECU that charging of power storage device 10-1 is performed by charger 42. When charging of power storage device 10-2 is performed by charger 42, power calculation portion 52 calculates charging power of power storage device 10-2 based on the detected values of voltage VB2 and current IB2 and outputs the operation result as monitor value PM to subtraction portion 53. Furthermore, when charging of power storage device 10-3 is performed by charger 42, power calculation portion 52 calculates charging power of power storage device 10-3 based on the detected values of voltage VB3 and current IB3 and outputs the operation result as monitor value PM to subtraction portion 53.

Subtraction portion 53 subtracts monitor value PM calculated by power calculation portion 52 from target value PR of charging power (kW/h) of power storage devices 10-1 to 10-3 that is received from the above-noted not-shown vehicle ECU, and then outputs the operation result to feedback control portion 54. It is noted that target value PR may be different or equal between power storage devices 10-1 to 10-3.

Feedback control portion 54 performs a proportional-plus-integral operation (PI control) using, as a control input, a deviation of a monitor value from target value PR of charging power (kW/h) that is received from subtraction portion 53, and outputs the operation result to output restriction portion 65 as a feedback correction value PC0.

Output restriction portion 65 imposes restriction such that power command value CHPW is not too far away from target value PR. Correction value PC0 before being restricted that is output from feedback control portion 54 is restricted and set to a value not too far away from zero, which is then output as a correction value PC. Addition portion 62 adds correction value PC received from output restriction portion 65 to target value PR and outputs the operation result as power command value CHPW.

In charging ECU 46, feedback control is performed by feedback control portion 54 such that charging power (kW/h) of power storage devices 10-1 to 10-3 agrees with prescribed target value PR.

[Control Over Charger]

Figure 6:
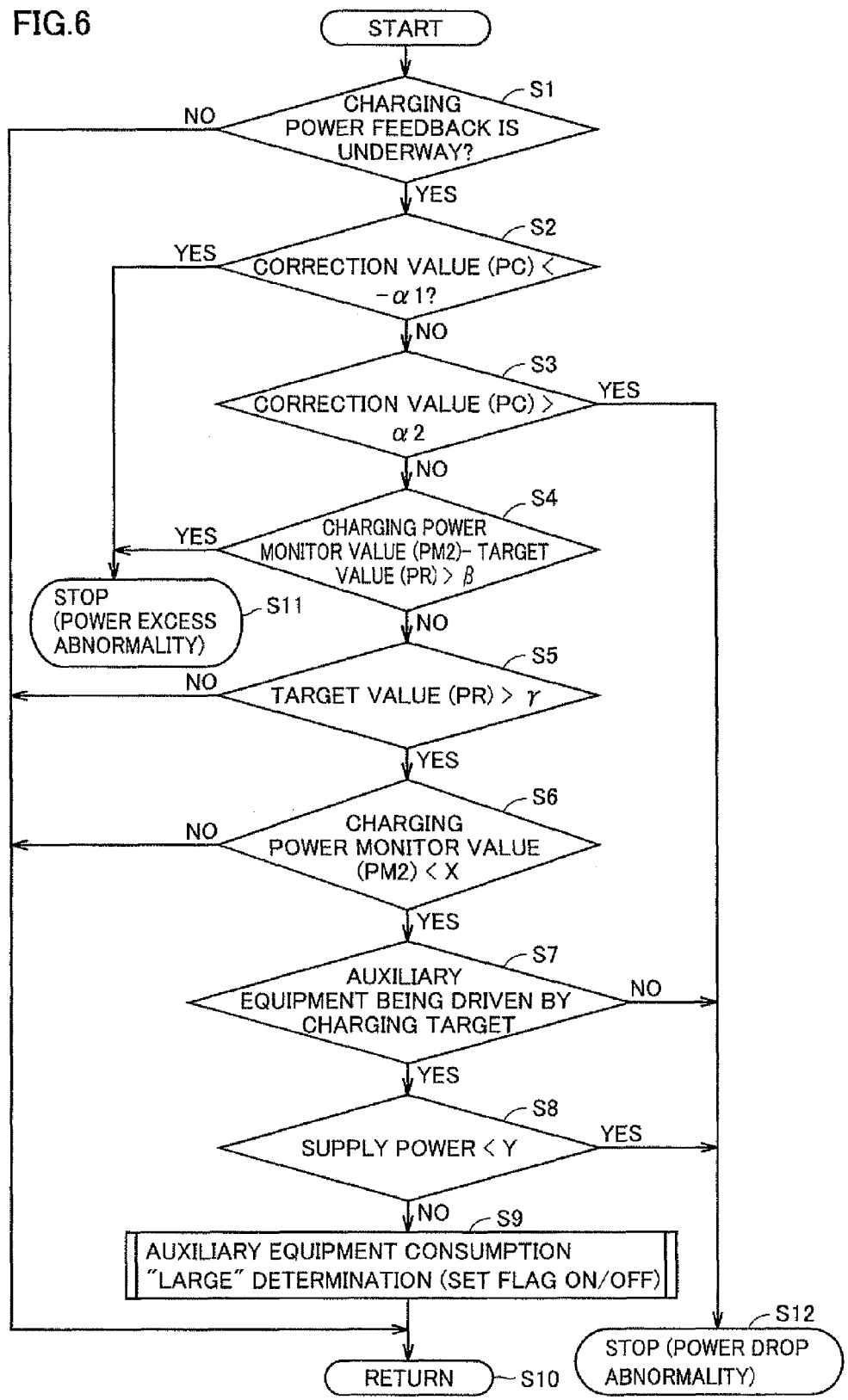
FIG. 6 is a flowchart of abnormality determination and charging stop control of the charger, which is executed by charger ECU 46 at a time of external charging.
Figure 14:
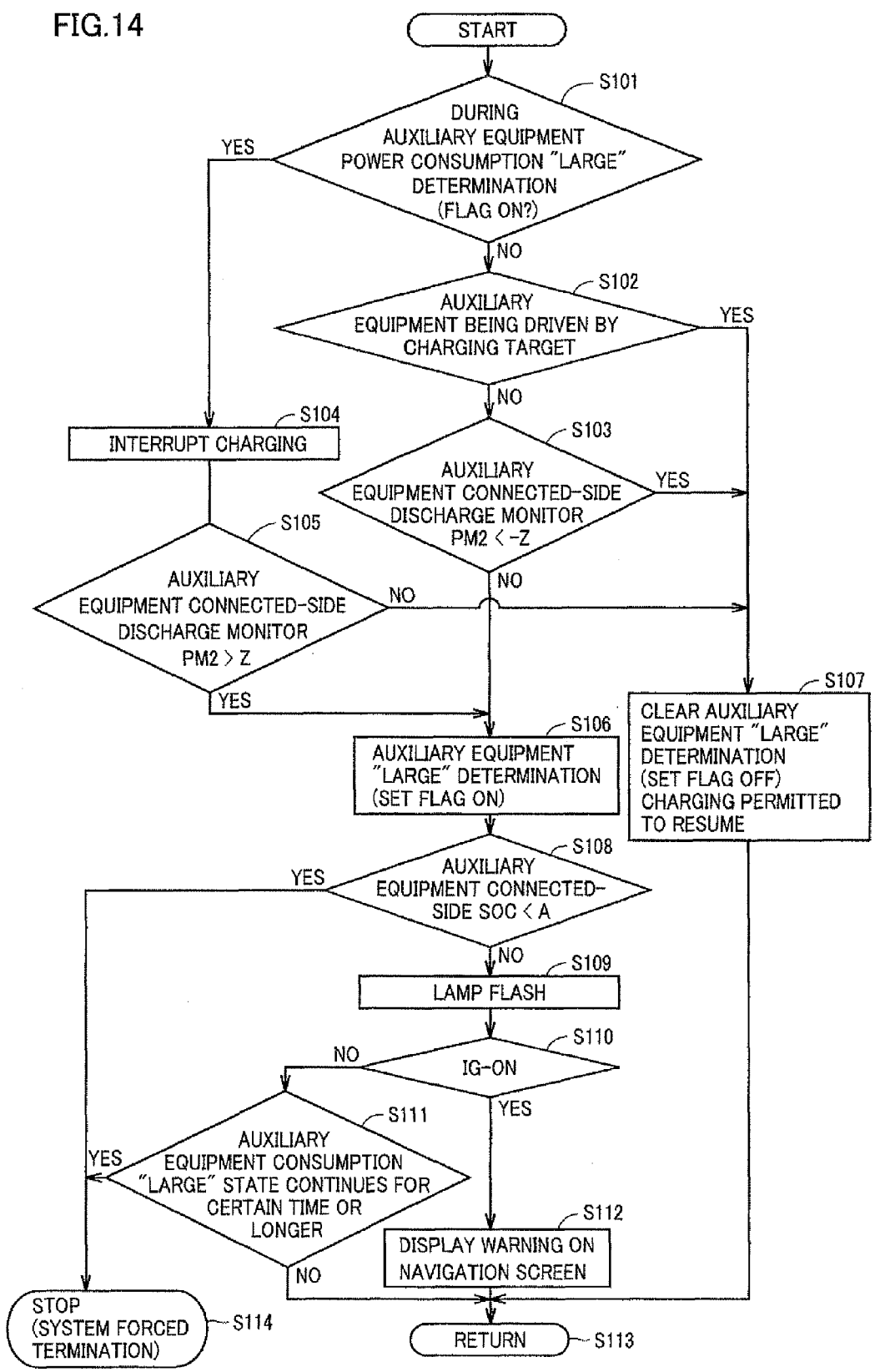
FIG. 14 is a flowchart showing details of the auxiliary equipment consumption "large" determination executed in step S9 in FIG. 6.

In the present embodiment, in the structure of the hybrid vehicle as described above, charging ECU 46 performs control shown in FIG. 6 and FIG. 14 for abnormality detection as well as stop, interruption and resumption of charging of charger 42.

FIG. 6 is a flowchart of abnormality determination and charging stop control of the charger at a time of external charging, which is executed by charging ECU 46 in FIG. 1. The process in this flowchart is invoked from a prescribed main routine and executed at regular time intervals or every time a prescribed condition is met. Although in actuality duration of a prescribed time is required to establish the determination, a process of measuring a prescribed time by a counter is not illustrated in the following description, for the sake of brevity.

Referring to FIG. 1 and FIG. 6, upon starting of the process, first, it is determined by charging ECU 46 whether charging power feedback is underway or not, in step S1. Whether charging power feedback is underway or not means whether charging ECU 46 is executing feedback control by outputting power command value CHPW to charger 42 so that the actually charged power comes closer to target value PR.

If charging power feedback is not underway in step S1, the process proceeds to step S10 and the control goes to the main routine. On the other hand, if it is determined that charging power feedback is underway in step S1, the process proceeds to step S2.

In step S2, it is determined whether or not correction value PC added to target value PR by addition portion 62 in FIG. 5 is smaller than threshold value $-\alpha 1$.

Figure 7:
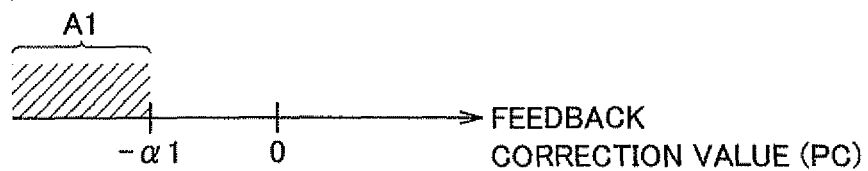
FIG. 7 is a diagram for illustrating the determination in step S2 in FIG. 6.

FIG. 7 is a diagram for illustrating the determination in step S2 in FIG. 6.

In FIG. 7, a region A1 in which feedback correction value PC is smaller than $-\alpha 1$ corresponds to a state in which power command value CHPW is output with a correction smaller than $-\alpha 1$ being made to target value PR. In such a state, electric power sent from charger 42 to any of power storage devices 10-1, 10-2, 10-3 is too large, and therefore the correction value is output to rapidly reduce the electric power. In this case, the process proceeds to step S11, and the diagnosis is determined such that power output from charger 42 abnormally exceeds the target value, so that charging is stopped.

On the other hand, if correction value PC<$-\alpha 1$ does not hold in step S2, the process proceeds to step S3. In step S3, it is determined whether correction value PC is greater than a threshold value $\alpha 2$.

Figure 8:
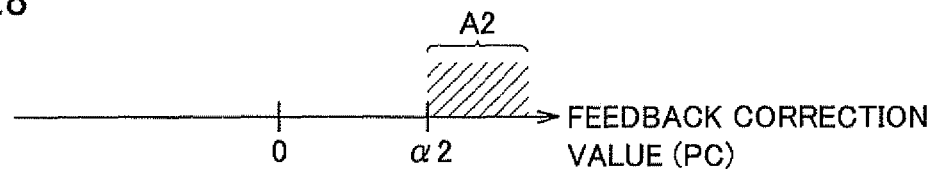
FIG. 8 is a diagram for illustrating the determination in step S3 in FIG. 6.

FIG. 8 is a diagram for illustrating the determination in step S3 in FIG. 6.

As shown in FIG. 8, a region A2 in which feedback correction value PC is greater than threshold value $\alpha 2$ shows a state in which power command value CHPW is output with a correction greater than threshold value $\alpha 2$ being made to target value PR in FIG. 5.

It is assumed that in this state, charger 42 cannot output so much power due to a failure or the like. Therefore, if PC>$\alpha 2$ holds, the process proceeds to step S12, and the diagnosis is determined such that power of charger 42 is extremely lower than the target value, so that charging is stopped.

On the other hand, if PC>$\alpha 2$ does not hold in step S3, the process proceeds to step S4. In step S4, it is determined whether or not the difference between charging power monitor value PM2 and target value PR is greater than a threshold value $\beta$.

Figure 9:
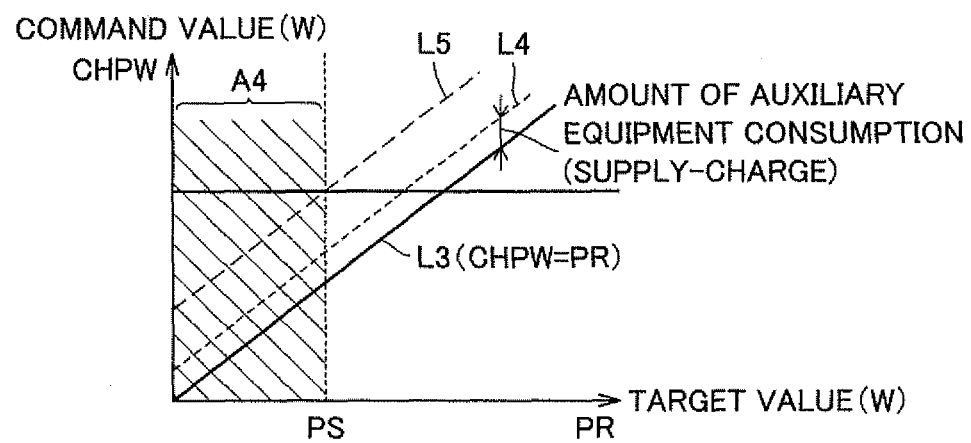
FIG. 9 is a diagram showing the relation between a target value PR and a power command value CHPW.

FIG. 9 is a diagram showing the relation between target value PR and power command value CHPW.

As shown in FIG. 9, power command value CHPW is determined by line L4 obtained by adding power corresponding to the amount of auxiliary equipment power consumption to target value PR ($\approx$PM2). Line L5 is a line obtained by adding an estimated value at which the auxiliary equipment power consumption is maximum, and line L4 is positioned between line L3 and line L5. When charger 42 performs the saving operation, even a large target value PR is restricted to limit value PS by charger 42, so that power command value CHPW is also restricted within region A4, in the inside of charger 42.

Figure 10:
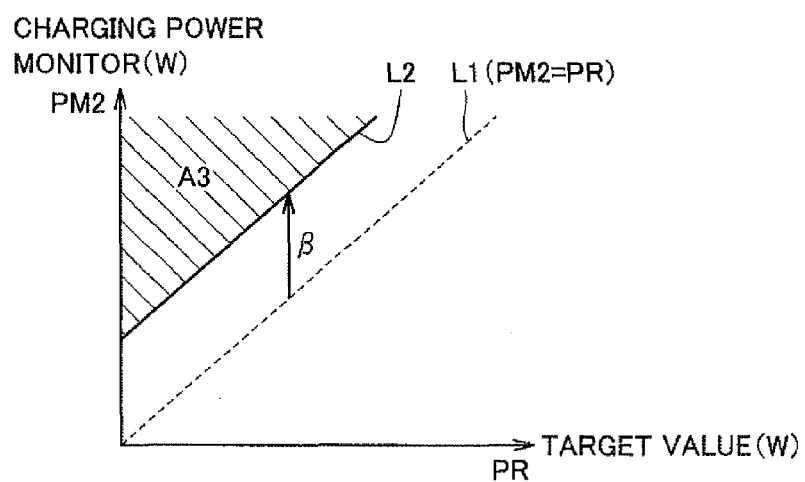
FIG. 10 is a diagram for illustrating the process in step S4 in FIG. 6.

FIG. 10 is a diagram for illustrating the process in step S4 in FIG. 6.

Referring to FIG. 10, the horizontal axis represents target value PR, and the vertical axis represents charging power monitor value PM2. It is noted that charging power monitor value PM2 is determined by obtaining power charged to the power storage device as a charging target, from a product of the detected values of the corresponding current sensor and voltage sensor. In other words, PM2 is any one of TB1×VB1, IB2×VB2, and IB3×VB3.

Then, line L1 is a straight line where target value PR agrees with charging power monitor value PM2. By contrast, line L2 is a line indicating a state in which charging power monitor value PM2 is greater than target value PR by threshold value $\beta$. Then, region A3 is a region where the difference is equal to or greater than threshold value $\beta$.

Therefore, in step S4 in FIG. 6, charging ECU 46 performs a process of determining whether or not the operating point of the charging system during charging is present in region A3. If the difference between charging power monitor value PM2 and target value PR is greater than $\beta$ in step S4, the process proceeds to step S11, and the diagnosis is determined, so that charging is halted. In this case, excessive power, which exceeds $\beta$ indicating a proper permissible value, is output from the charger. This may be a case, for example, where charger 42 is failed and power greater than the command value is output.

On the other hand, if the difference between charging power monitor value PM2 and target value PR is not greater than threshold value $\beta$ in step S4, the process proceeds to step S5. In step S5, it is determined whether or not target value PR is greater than a prescribed value $\gamma$. Then, in step S6, it is determined whether or not charging power monitor value PM2 is smaller than a prescribed value X.

Figure 11:
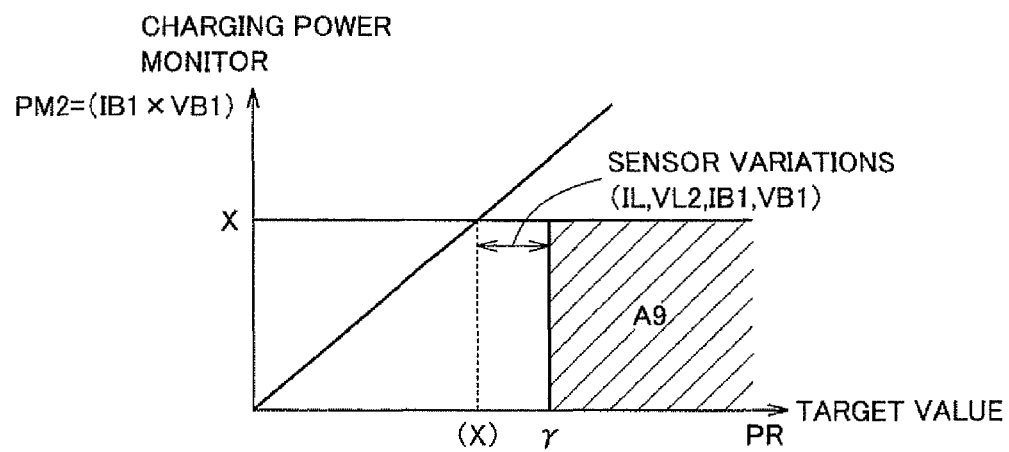
FIG. 11 is a diagram for illustrating the determination executed in steps S5, S6 in FIG. 6.

FIG. 11 is a diagram for illustrating the determination executed in steps S5, S6 in FIG. 6.

In FIG. 11, the horizontal axis represents target value PR and the vertical axis represents charging power monitor value PM2. When the charging target is power storage device 10-1, which is a master battery, charging power monitor value PM2 is IB1×VB1.

It is noted that determination threshold value γ for target value PR is a value set greater than threshold value X for charging power monitor value PM2, considering variations of sensors detecting measured values IL, VL2, IB1, VB1.

Here, threshold value X is lower limit charging power for avoiding such a determination error in that overcharge cannot be detected in determination of the state of charge of the power storage device. For example, while it is well known that the state of charge of power storage devices can be determined by open-circuit voltage (OCV), it is not open-circuit voltage (OCV) but closed-circuit voltage (CCV) that can be detected when constant power charging (CP charging) is carried out. Then, the determination is made by a threshold value corresponding to this CCV after completion of charging. However, assuming that CCV threshold value is set where the difference of closed-circuit voltage (CCV) from open-circuit voltage (OCV) is, for example, 0.2V, which is a difference at a time when charging of 0.5 kW is performed. Here, 0.5 kW corresponds to guaranteed power for calculating SOC correctly. At this point, if charging power is smaller than 0.5 kW, the difference between CCV and OCV is smaller than 0.2V. Therefore, if charging power is small, the actual OCV becomes greater than the estimated OCV (CCV—the amount of voltage increase resulting from internal resistance corresponding to the guaranteed power). Thus, overcharge may occur in the power storage device.

For example, it is assumed that charging is executed until CCV is 4.2V in order to achieve 4.0V of OCV. If charging power is smaller than 0.5 kW, and when charging is performed until CCV is 4.2V, OCV attains a value higher than 4.0V, which is greater than the estimated SOC. Thus, overcharge may occur.

In FIG. 11, a case where the operating point belongs to region A9 is a case where the actual monitored value as charging power (charging power monitor value PM2=IB1×VB1) is abnormally small in spite of a large target value PR.

If the operating point of the charging system belongs to region A9 in FIG. 11, the process proceeds from step S5 through step S6 to step S7. On the other hand, if the operating point of the charging system does not belong to region A9, the process proceeds from step S5 or step S6 to step S10 and the control goes to the main routine.

When the process proceeds from step S6 to step S7, it is determined whether or not the auxiliary equipment is being driven by the power storage device which is a charging target, in step S7. In other words, in the structure in FIG. 1, auxiliary equipment 22 receives power supply from power storage device 10-1, and therefore, it is determined whether the charging target is power storage device 10-1 or not, in step S7.

If, in step S7, the charging target is not the power storage device to which the auxiliary equipment is connected, that is, power storage device 10-1 in FIG. 1, the process proceeds to step S12. In this case, it is found that charging power monitor value PM2 charged to target power storage device 10-2 or 10-3 from charger 42 is abnormally smaller than target value PR. Therefore, in step S12, it is diagnosed that such a failure that prevents output of power corresponding to the command value takes place in charger 42, and charging is halted. Then, the diagnosis of failure is determined.

On the other hand, if the charging target is the power storage device that supplies power to auxiliary equipment 22 in step S7, the process proceeds from step S7 to step S8. In step S8, it is determined whether supply power output from charger 42 is smaller than threshold value Y or not.

Figure 12:
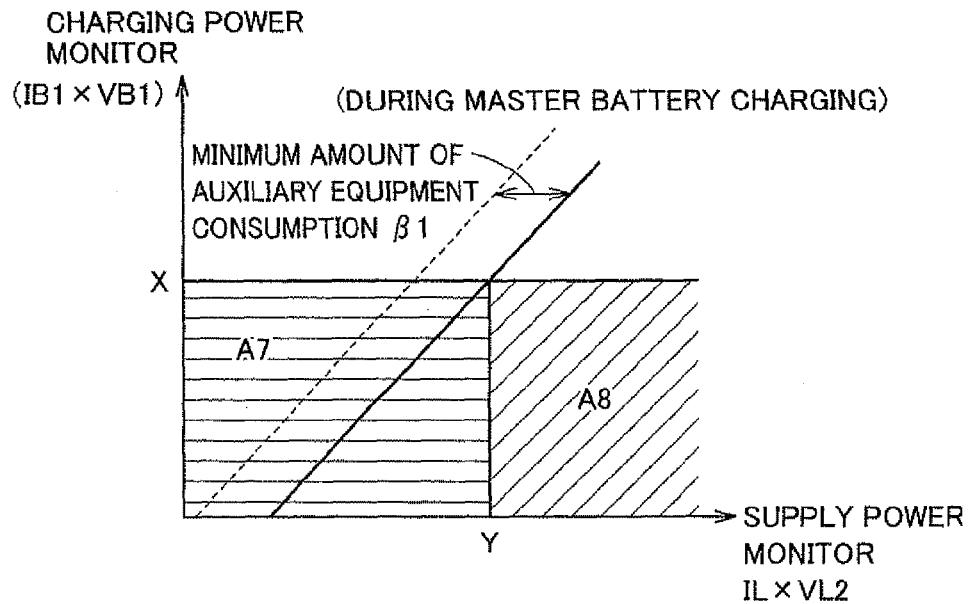
FIG. 12 is a diagram for illustrating the determination in step S8 in FIG. 6.

FIG. 12 is a diagram for illustrating the determination in step S8 in FIG. 6. It is noted that FIG. 12 is a determination map applied to a case where power storage device 10-1 serving as a master battery is a charging target.

Referring to FIG. 12, the horizontal axis represents a value (IL×VL2) obtained by monitoring power output from charger 42 in FIG. 1. The vertical axis represents a value (IB1×VB1) obtained by monitoring power charged to the target power storage device 10-1.

Here, threshold value X is, as illustrated in FIG. 11, lower limit charging power for preventing such a determination error in that overcharge cannot be detected in determination of the state of charge of the power storage device. The process in step S8 is not executed before the charging power monitor value is restricted to be smaller than threshold value X in step S6.

Then, if the operating point is present in region A7 in FIG. 12, an error may occur in the estimated SOC of the charging target and overcharge may take place. Therefore, the process proceeds from step S8 to step S12. In step S12, charging is halted, and in addition, the diagnosis of output power drop abnormality of charger 42 is determined. On the other hand, if the operating point belongs to region A8, the process proceeds from step S8 to step S9. In this case, although power is output from charger 42, power consumed in auxiliary equipment 22 is large, and therefore there is a possibility that power charged to power storage device 10-1 is small. In step S9, a determination is made as to whether power consumed in auxiliary equipment 22 is large or not (hereinafter referred to as auxiliary equipment consumption "large" determination), and a prescribed flag corresponding to the determination result is set ON/OFF.

Upon completion of determination in step S9, the control goes to the main routine in step S10.

Figure 13:
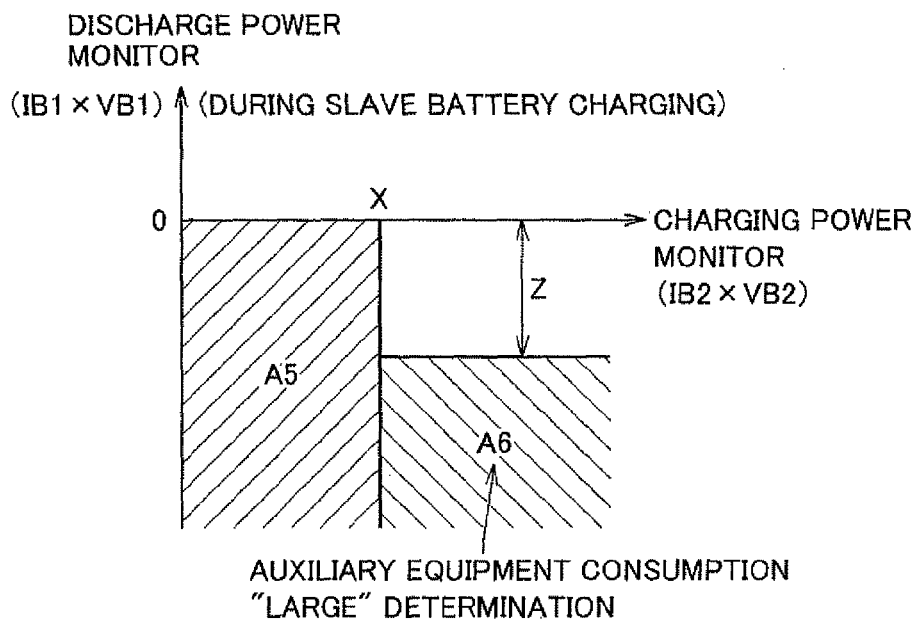
FIG. 13 is a diagram for illustrating auxiliary equipment consumption "large" when a slave battery is charged.

FIG. 13 is a diagram for illustrating the auxiliary equipment consumption "large" determination in a case where the slave battery is charged.

Referring to FIG. 13, the horizontal axis shows that (IB2×VB2) is set as a charging power monitor value. The horizontal axis represents a monitor value (IB1×VB1) of power discharged from power storage device 10-1 for performing power supply to auxiliary equipment 22. Threshold value X is a threshold value showing minimum power for guaranteeing correct detection of SOC of the power storage device, as illustrated in FIG. 11, FIG. 12. A threshold value Z is a threshold value for determining auxiliary equipment consumption "large" that is applied when the slave power storage device is charged.

Region A5 is a region where it is determined that a failure of decreasing output power occurs in charger 42, and region A6 is a region where it is determined that power consumption in the auxiliary equipment is large.

FIG. 14 is a flowchart showing the detail of the auxiliary equipment consumption "large" determination that is executed in step S9 in FIG. 6.

Referring to FIG. 14, upon starting of the process in this flowchart, first, in step S101, it is determined whether auxiliary equipment power consumption "large" is determined or not. This can be determined by whether the corresponding flag is in the ON state or not. If it is not determined that power consumption of the auxiliary equipment is large in step S101, the process proceeds to step S102.

In step S102, it is determined whether the auxiliary equipment is being driven or not by the power storage device as a charging target. In other words, it is determined whether the power storage device that drives the auxiliary equipment is the present target of external charging by charger 42. If it is determined that the auxiliary equipment is being driven by the power storage device as a charging target in step S102, the process proceeds to step S107. On the other hand, if the auxiliary equipment is not being driven by the power storage device as a charging target, the process proceeds to step S103. In this case, power storage device 10-1 drives the auxiliary equipment but is not charged. In other words, discharging is performed in the master battery.

In step S103, it is determined whether or not auxiliary equipment-side discharge power monitor value PM2 is smaller than a threshold value −Z. Here, auxiliary equipment-side discharge power monitor value PM2 is IB1×VB1. If PM2<−Z holds in step S103, the process proceeds to step S107, and if not, the process proceeds to step S106.

On the other hand, if auxiliary equipment power consumption "large" is determined in step S101, the process proceeds to step S104. Then, charging is temporarily interrupted, and the process further proceeds to step S105. In step S105, it is determined whether or not auxiliary equipment-side discharge power monitor value PM2 is larger than threshold value Z. If PM2>Z holds in step S105, the process proceeds to step S106, and if not, the process proceeds to step S107.

In step S106, a determination that auxiliary equipment power consumption is "large" is made. Corresponding to this determination, the flag is set to the ON state.

On the other hand, in step S107, the determination that auxiliary equipment power consumption is "large" is cleared, and the corresponding flag is set to the OFF state. Then, charging is permitted to resume. Upon completion of the process in step S107, the process proceeds to step S113, and the control goes to the main routine.

On the other hand, if the determination that auxiliary equipment power consumption is "large" is made in step S106, the process proceeds to step S108, and it is determined whether or not the state of charge (SOC) of the power storage device that drives the auxiliary equipment is smaller than a threshold value A. In the structure in FIG. 1, the power storage device that drives the auxiliary equipment is power storage device 10-1. Then, threshold value A is a lower limit control value of the state of charge (SOC) for preventing damages of power storage device 10-1 and is defined based on the characteristics of the power storage device.

If the auxiliary equipment-side SOC is smaller than threshold value A in step S108, the process proceeds to step S114, and the system of the vehicle is forced to terminate. This can prevent over-discharging of power storage device 10-1 in FIG. 1.

On the other hand, if SOC<A does not hold in step S108, the process proceeds to step S109. In step S109, pilot lamp 43 outside the vehicle is caused to flash. The pilot lamp outside the vehicle is caused to flash in order to notify the user that the user may have forgotten to turn off the auxiliary equipment consuming much power, such as a head lamp or a hazard lamp, and left the car. It is noted that the pilot lamp is turned on during execution of charging, and in step S109, and it is caused to flash at unique intervals or with a unique color to invite the user's attention. The flashing method is described in advance, for example, in the accompanying instruction manual of the vehicle.

Then, in step S110, it is determined whether the ignition key switch is in the ON state or not. It is noted that the ON state of the ignition key switch indicates a state in which the vehicle is ready to start (Ready ON state).

If the ignition key switch is not in the ON state in step S110, the process proceeds to step S111. In this case, the user often does not stay inside the vehicle, and it is likely that the auxiliary equipment that has not been turned off is left as it is.

Therefore, in step S111, when the state in which auxiliary equipment discharge power monitor value PM2 is large continues for a certain period of time or longer, the process proceeds to step S114, and the system is forced to terminate. This brings about the open state of system main relay 11-1 in FIG. 1, so that over-discharging from power storage device 10-1 is prevented and the power storage device is protected.

On the other hand, if the state in which auxiliary equipment discharge power monitor value PM2 is large does not continue for a certain period of time or longer in step S111, the process proceeds to step S113, and the control goes to the main routine.

Furthermore, if the ignition key switch is in the ON state in step S110, the process proceeds to step S112, and charging ECU 46 causes navigation ECU 45 to display a warning message on the navigation screen. This warning message is, for example, interrupt display such as "Charging power is not enough. Please turn off the IG lamp." Alternatively, when the level of power storage device 10-1 as a master battery is low, display may provide a sense of urgency, for example, by turning the navigation screen red.

After display of a warning message is executed in step S112, the process proceeds to step S113, and the control goes to the main routine.

Figure 15:
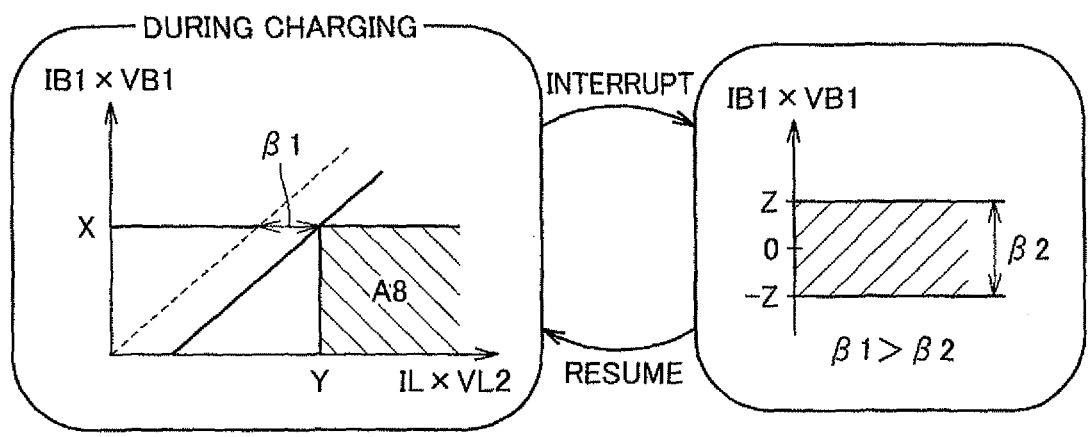
FIG. 15 is a diagram for illustrating interruption and resumption of charging at a time of master battery charging.

FIG. 15 is a diagram for illustrating charging interruption and resumption at a time of master battery charging.

Referring to FIG. 15, first, if the operating point belongs to a region A8 during master battery charging, charging ECU 46 causes charger 42 to suspend charging. This is the case where the master battery cannot be charged with power greater than threshold value X because of large power consumption by the auxiliary equipment. In such a case, the state of charge (SOC) cannot be calculated correctly, so that the master battery may be overcharged. Therefore, charging is temporarily interrupted.

Then, because of the operation stop of the auxiliary equipment, power IB1×VB1 discharged from the master battery decreases, and when it comes within ±Z, charging is resumed. Since the auxiliary equipment consuming much power is stopped, charging with power greater than threshold value X can be expected at the time of charging resumption.

In this case, in order to prevent hunting in which charging interruption and resumption becomes frequent when power IL×VL2 supplied from charger 42 varies greatly, it is preferable that β1>β2 is set and hysteresis is provided, in FIG. 15.

Furthermore, when charging interruption and resumption is repeated more than the set number of times within a certain period of time, the diagnosis may be determined such that power output by the charger abnormally decreases, and the system may be terminated.

On the other hand, at a time of charging of the slave battery, namely, power storage device 10-2 or 10-3 in FIG. 1, if charging is continued, over-discharging of the master battery may be caused by auxiliary equipment power consumption, before completion of charging to the slave battery. In such a case, times TA, TB are calculated using the following equations, and the user is notified based thereon.

$TA$(remaining charging time)=(slave battery remaining charge capacity)/(charging power)

$TB$(master battery SOC duration)=((master battery SOC)−(forced end SOC))/(auxiliary equipment power consumption)

Then, if TB<TA, auxiliary equipment power consumption "large" is determined, even if auxiliary equipment power consumption is smaller than threshold value X in FIG. 15. Then, the user is notified thereof although charging to the slave battery is continued.

Here, the auxiliary equipment consumption "large" determination value, which is a threshold value to be compared with the auxiliary equipment power consumption, can be calculated by (master battery remaining amount of power)/(slave battery remaining charge capacity)×(charging power).

Finally, the present embodiment will be summarized with reference to FIG. 1. The charging system of a vehicle for charging vehicle-mounted power storage devices 10-1 to 10-3 in accordance with the present embodiment includes charger 42 configured to receive electric power from power supply 48 external to the vehicle for charging power storage devices 10-1 to 10-3, a charging power sensing portion (voltage sensors 14-1 to 14-3, current sensors 16-1 to 16-3) for sensing charging power supplied to power storage devices 10-1 to 10-3, and a charging control device (charging ECU 46) for performing control on charger 42 by generating power command value CHPW for charger (42) based on target value PR. The charging control device detects the difference between charging power monitor value PM2 sensed by the charging power sensing portion and target value PR and determines presence/absence of abnormality in charger 42 based on the detected difference, as shown in step S4 in FIG. 6.

Preferably, vehicle 100 includes auxiliary equipment 22 that can be driven by a part of electric power output from charger 42. The charging system of vehicle 100 further includes a charger output power sensing portion (voltage sensor 18-2, current sensor 19) for sensing electric power output from charger 42. The charging control device determines whether or not auxiliary equipment power consumption in auxiliary equipment 22 is excessive to secure appropriate charging power (threshold value X in FIG. 11, FIG. 12), based on the electric power output from charger 42 and charging power. If it is determined that the auxiliary equipment power consumption is excessive, when the state of charge of the power storage device becomes smaller than threshold value A (YES in step S108 in FIG. 14) or when a time period during which auxiliary equipment power consumption is excessive exceeds a prescribed time (YES in step S111 in FIG. 14), vehicular system forced termination, including stopping operation of auxiliary equipment 22, is executed (step S114 in FIG. 14).

More preferably, if it is determined that the auxiliary equipment power consumption is excessive, the charging control device interrupts external charging to power storage devices 10-1 to 10-3 by charger 42 and resumes charging to the power storage devices when the auxiliary equipment power consumption decreases after the interruption to bring about a state in which appropriate charging power can be secured.

More preferably, the appropriate charging power (threshold value X) is power greater than a lower limit value at which the state of charge (SOC) of the power storage devices can be estimated appropriately based on output of the charging power sensing portion.

More preferably, the power storage device includes a first power storage device 10-1 connected to a power supply path (PL1, NL1) to the auxiliary equipment and a second power storage device 10-2 connected to a path (PL2, NL2) to which output of charger 42 is connected. The charging system of the vehicle further includes a first voltage converter 12-1 for performing voltage conversion between voltage VL1 of the first power storage device and supply voltage VH to an electric load and a second voltage converter 12-2 for performing voltage conversion between voltage VL2 of second power storage device 10-2 and supply voltage VH. The charging control device selects a charging target receiving charging power from charger 42 from first and second power storage devices 10-1, 10-2 by controlling the first and second voltage converters. In a case where first power storage device 10-1 is the charging target, if it is determined that the auxiliary equipment power consumption is excessive, the charging control device interrupts external charging to the charging target by charger 42 and resumes charging to the charging target when the auxiliary equipment power consumption decreases after interruption to bring about a state in which appropriate charging power can be secured. In a case where second power storage device 10-2 is the charging target, if it is determined that the auxiliary equipment power consumption is excessive, the charging control device executes vehicular system forced termination including stopping operation of the auxiliary equipment when the state of charge (SOC) of the charging target becomes smaller than threshold value A (YES in step S108) or when a time period during which the auxiliary equipment power consumption is excessive exceeds a prescribed time (YES in step S111).

Preferably, the vehicle (100) includes a motor (motor generator 32-2) for driving the vehicle that receives power from power storage devices 10-1 to 10-3 to operate, and an internal combustion engine (engine 36) for driving the vehicle together with the motor.

The characteristics of the present embodiment are listed as follows.

(1) An abnormality of charger 42 is sensed based on that a deviation of a feedback correction amount is greater than a threshold value, before charging power departs from a target value (steps S2, S3 in FIG. 6). In order to instantaneously sense even a sudden failure, a threshold value is set even for the absolute value of charging power or a deviation of the charging power monitor value from the target value. When either value exceeds the threshold value, the diagnosis of failure of charger 42 is determined.

(2) In detection of a decrease in the monitor value, a lower limit of target power is set in order to prevent a failure detection error due to sensor output variations (FIG. 11).

(3) In addition, in detection of a decrease in the power absolute value, an abnormality is detected exclusively when the battery that drives the auxiliary equipment and the charging target battery are the same (YES in step S7 in FIG. 6) and exclusively when supply power is also decreased (YES in step S8) in order to prevent a failure detection error at a time of power consumption increase in the auxiliary equipment.

(4) When charging power decreases with the above-noted conditions (3) not being met, it is determined that power consumption in the auxiliary equipment is large, and charging is interrupted (step S104 in FIG. 14) in order to prevent overcharge. When the auxiliary equipment driving battery and the charging target battery are different (YES in step S102), charging is continued (the auxiliary equipment power consumption is monitored by the discharge amount of the auxiliary equipment-connected battery).

(5) When power consumption in the auxiliary equipment is "large," a display system is operated to invite the user's attention for stopping the auxiliary equipment (steps S109, S112 in FIG. 14). The attention inviting method is switched as appropriate, for example, between display on the navigation screen at a time of IG-ON and flashing of a pilot lamp outside the vehicle in a unique pattern at a time of IG-OFF. Here, the pilot lamp may not be caused to flash at a time of IG-ON. However, pilot lamp 43 always flashes in the flowchart in FIG. 14, assuming that the user may have forgotten to turn off the ignition key switch and got out of the car.

Alternatively, based on IG-OFF and that power consumption is within the expectation, attention may be invited exclusively to specific auxiliary equipment (auxiliary equipment that is not cooperated with the ignition key switch, such as a lamp and a hazard lamp).

Furthermore, when the charging target is not power storage device 10-1 that drives the auxiliary equipment, if such power consumption that leads to forced termination of power storage device 10-1 before completion of charging of power storage device 10-2 or 10-3 is smaller than the auxiliary equipment power consumption "large" determination threshold value, display for inviting attention may be presented in favor of the smaller one.

(6) If the auxiliary equipment-side battery capacity reaches a threshold value or lower at the time of auxiliary equipment power consumption "large," the system is forced to terminate in order to protect the battery from over-discharging (YES in step S108). If the consumption amount and the consumption time exceed threshold values, it is determined that the user has left the vehicle, and the system is forced to terminate before the remaining capacity decreases (YES in step S111).

(7) If the power consumption of the auxiliary equipment decreases during interruption at the time of auxiliary equipment power consumption "large" (NO in step S105) and thus the required amount of charge is secured and overcharge due to SOC calculation error is avoided, the process returns to charging to provide the opportunity of charging.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

The invention claimed is:

1. A charging system of a vehicle for charging a vehicle-mounted power storage device comprising:
a charger configured to receive electric power from a power supply external to the vehicle for charging said power storage device;
a charging power sensing portion for sensing charging power supplied to said power storage device; and
a charging control device for performing control on said charger by generating a power command value for said charger based on a target value, wherein said charging control device detects a difference between charging power sensed by said charging power sensing portion and said target value and determines presence and absence of abnormality of said charger based on the detected difference, said vehicle includes auxiliary equipment that is configured being driven by part of electric power output from said charger,
said power storage device includes:
a first power storage device connected to a power supply path to said auxiliary equipment, and
a second power storage device to which output of said charger is connected,
said charging system of the vehicle further comprising:
a first voltage converter for performing voltage conversion between voltage of said first power storage device and supply voltage to an electric load, and
a second voltage converter for performing voltage conversion between voltage of said second power storage device and said supply voltage, wherein
said charging control device selects a charging target receiving said charging power from said charger from said first and second power storage devices by controlling said first and second voltage converters,
in a case where said first power storage device is a charging target, if it is determined that said auxiliary equipment power consumption is excessive, said charging control device interrupts external charging to said charging target by said charger and resumes charging to said charging target when said auxiliary equipment power consumption decreases after interruption to bring about a state in which appropriate said charging power is configured being secured, and
in a case where said second power storage device is a charging target, if it is determined that said auxiliary equipment power consumption is excessive, said charging control device executes vehicular system forced termination including stopping operation of said auxiliary equipment when a state of charge of said charging target becomes smaller than a threshold value or when a time period during which said auxiliary equipment power consumption is excessive exceeds a prescribed time.

2. The charging system of the vehicle according to claim 1, wherein
said charging system of the vehicle further comprising a charger output power sensing portion for sensing electric power output from said charger, wherein
said charging control device determines whether or not auxiliary equipment power consumption in said auxiliary equipment is excessive to secure appropriate said charging power, based on the electric power output from said charger and said charging power, and if it is determined that said auxiliary equipment power consumption is excessive, executes vehicular system forced termination including stopping operation of said auxiliary equipment when a state of charge of said power storage device becomes smaller than a threshold value or when a time period during which said auxiliary equipment power consumption is excessive exceeds a prescribed time.

3. The charging system of the vehicle according to claim 2, wherein if
it is determined that said auxiliary equipment power consumption is excessive, said charging control device interrupts external charging to said power storage device by said charger and resumes charging to said power storage device when said auxiliary equipment power consumption decreases after interruption to bring about a state in which appropriate said charging power is configured being secured.

4. The charging system of the vehicle according to claim 2, wherein said appropriate said charging power is power greater than a lower limit value at which a state of charge of said power storage device is configured being estimated appropriately based on output of said charging power sensing portion.

5. The charging system of the vehicle according to claim 1, wherein
said vehicle includes
a motor for driving the vehicle, said motor receiving electric power from said power storage device to operate, and
an internal combustion engine for driving the vehicle together with said motor.

6. The charging system of the vehicle according to claim 3, wherein said appropriate said charging power is power greater than a lower limit value at which a state of charge of said power storage device is configured being secured estimated appropriately based on output of said charging power sensing portion.

\* \* \* \* \*